US012655908B2

(12) United States Patent
Lang et al.

(10) Patent No.: US 12,655,908 B2
(45) Date of Patent: Jun. 16, 2026

(54) MECHANICAL SEAL ASSEMBLY WITH MONITORING FUNCTION, AND METHOD FOR THE SAME

(71) Applicant: EagleBurgmann Germany Gmbh & Co. KG, Wolfratshausen (DE)

(72) Inventors: Klaus Lang, Eurasburg (DE); Thomas Zauner, Pullach (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 748 days.

(21) Appl. No.: 17/779,470

(22) PCT Filed: Nov. 2, 2020

(86) PCT No.: PCT/EP2020/080661
§ 371 (c)(1),
(2) Date: May 24, 2022

(87) PCT Pub. No.: WO2021/115682
PCT Pub. Date: Jun. 17, 2021

(65) Prior Publication Data
US 2022/0412465 A1 Dec. 29, 2022

(30) Foreign Application Priority Data
Dec. 12, 2019 (DE) ..................... 10 2019 219 422.2

(51) Int. Cl.
*F16J 15/34* (2006.01)

(52) U.S. Cl.
CPC ....... *F16J 15/3492* (2013.01); *F16J 15/3412* (2013.01)

(58) Field of Classification Search
CPC ... F16J 15/3492; F16J 15/3412; F16J 15/3416
See application file for complete search history.

(56) References Cited

U.S. PATENT DOCUMENTS

| | | | |
|---|---|---|---|
| 3,917,289 A | 11/1975 | Ivanov et al. | |
| 2007/0296156 A1 | 12/2007 | Yanagisawa et al. | |
| 2020/0110109 A1* | 4/2020 | Goldswain ............ | G01P 13/045 |

FOREIGN PATENT DOCUMENTS

| | | | | |
|---|---|---|---|---|
| DE | 102011121636 A1 * | 6/2013 | .......... | F16J 15/3404 |
| EP | 0895010 A1 | 2/1999 | | |

(Continued)

OTHER PUBLICATIONS

Machine translation of JPS59117958A (Year: 1984).*
International Search Report issued in PCT/EP2020/080661, dated Jan. 25, 2021.

*Primary Examiner* — Stephen D Meier
*Assistant Examiner* — Quang X Nguyen
(74) *Attorney, Agent, or Firm* — Troutman Pepper Locke LLP; Scott D. Wofsy; Gabrielle L. Gelozin

(57) ABSTRACT

The invention relates to a mechanical seal arrangement comprising a slide ring seal (2) having a rotating slide ring (3) and a stationary slide ring (4) defining a sealing gap (5) therebetween, the rotating slide ring (3) having a first slide surface (30) with a first information structure (6), the stationary slide ring (4) having a second slide surface (40) with a second information structure (7) wherein the first information structure (6) and the second information structure (7) at least partially overlap in an overlap area (16), at least one sensor (8) for detecting sound and/or vibration, wherein the sound and/or the vibration is generated by the first information structure (6) when moving past the second information structure (7), and an evaluation unit (10), which is arranged to compare the sound and/or the vibrations detected with set values and to output a comparison result, characterized in that the second information structure (7) has a second sliding surface (40) with a second information structure (7), wherein the first information structure (6) and the second information structure (7) at least partially overlap in an overlap area (16).

17 Claims, 6 Drawing Sheets

(56)            References Cited

FOREIGN PATENT DOCUMENTS

Figure 1:
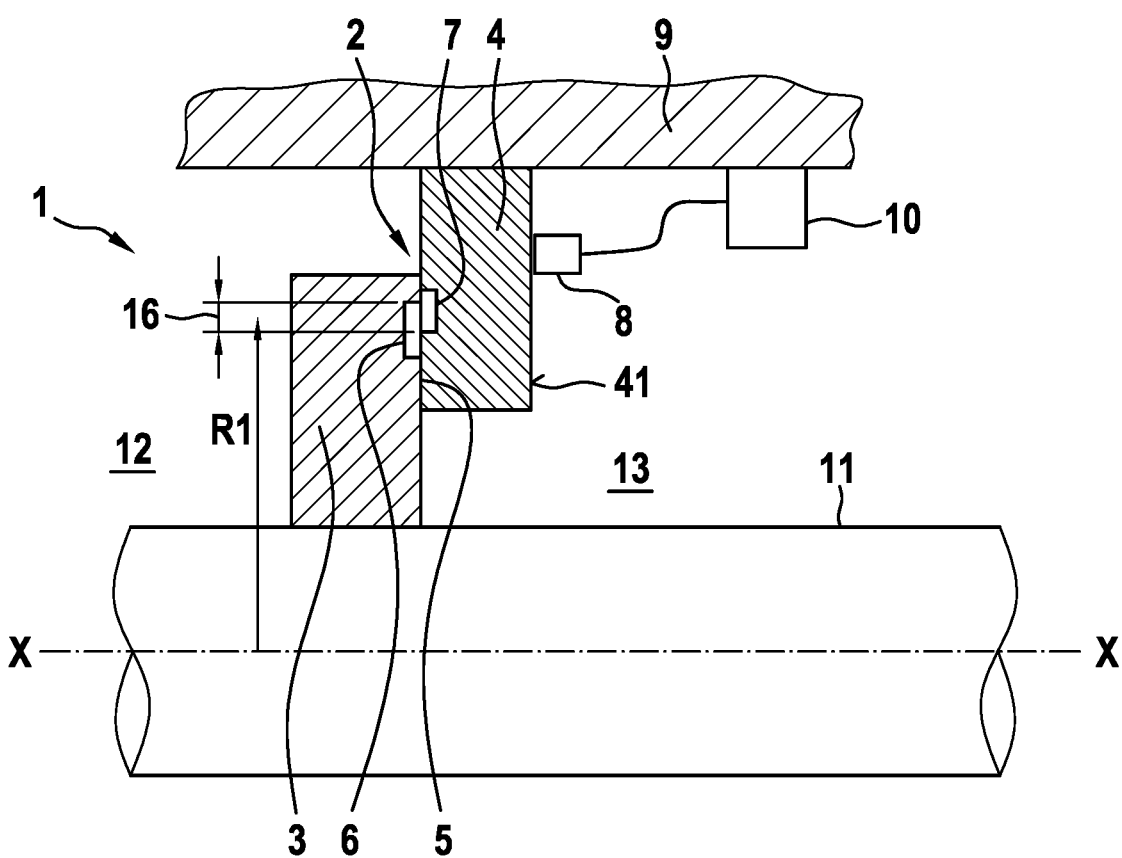

EP          3376079  A1  *   9/2018   ...........  F01D 21/003
JP          S59117958  A      7/1984

* cited by examiner

1

MECHANICAL SEAL ASSEMBLY WITH MONITORING FUNCTION, AND METHOD FOR THE SAME

CROSS-REFERENCE TO RELATED APPLICATIONS

This application is a U.S. National Phase Application filed under 35 U.S.C. § 371, based on International Patent Application No. PCT/EP2020/080661, filed Nov. 2, 2020, which claims priority to German Patent Application No. 10 2019 219 422.2, filed on Dec. 12, 2019, which are incorporated herein by reference.

The present invention relates to a mechanical seal arrangement with monitoring function by sound and/or vibration and a method for monitoring a mechanical seal.

End-face mechanical seal arrangements are known from prior art in various designs. During operation, for example, solid particles can get between the sliding surfaces of rotating and stationary slide rings and cause damage to the sliding surfaces. This may reduce the tightness of the mechanical seal, which can lead to increase in leakage. This leakage may subsequently be detected in the recirculated barrier fluid, for example, and replacement of the mechanical seal may be carried out. In practice, however, a certain amount of time is required before such mechanical seal replacement may be carried out. This may lead to a longer standstill of the machine where the mechanical seal is arranged for sealing, and is of great annoyance to the operator of the machine.

It is therefore the object of the present invention to provide a mechanical seal arrangement and a method which detects wear and/or damage or the like to the mechanical seal as early as possible and enables the mechanical seal arrangement to be prematurely replaced.

This object will be solved by a mechanical seal arrangement and a method having the features of claim 1, the respective subclaims showing preferred further embodiments of the invention.

In contrast, the mechanical seal arrangement according to the invention having the features of claim 1 has the advantage that any change occurring in the mechanical seal may prematurely be detected. This enables decision to be taken well in advance of any actual failure event of the mechanical seal arrangement as to whether the mechanical seal arrangement should be replaced or not. Thus, an appropriate mechanical seal arrangement may already be prepared and may subsequently be replaced within a short downtime of the machine at the machine user site. According to the invention, this will be achieved by the mechanical seal arrangement comprising a mechanical seal comprising a rotating slide ring and a stationary slide ring, which define a sealing gap between them. The rotating slide ring comprises a first sliding surface including first information structures and the stationary slide ring comprises a second sliding surface including second information structures. The first and second information structures are provided on the two sliding surfaces such that at least partial overlap at an overlap region will be provided. Overlap in this case means that the first and second information structures are arranged at least partially at the same radial height in the radial direction. Preferably, the first and second information structures overlap completely. Furthermore, the mechanical seal arrangement comprises at least one sensor for detecting sound and/or vibration, the sound and/or vibration being generated by moving the first information structures past the second information structures. Since the information structures at the two sliding surfaces at least partially overlap, characteristic sound noises and/or vibrations result, which can be detected by means of the sensor. Furthermore, an evaluation unit is provided which is installed to compare the detected sound waves and/or the detected vibrations with stored nominal values and to output a comparison result. Thus, by providing the information structures, it is possible to specifically detect waves and vibrations that change in the event of wear and/or the presence of solid particles or changes in other physical values such as pressure and/or temperature and/or density of the medium in the sealing gap. Based on the change in the sound and/or vibration detected, a condition of the mechanical seal arrangement can then be deduced and, if necessary, replacement may be imposed.

Preferably, the first and second information structures comprise defined recesses in the sliding surfaces of the rotating and stationary slide rings. The recesses on the sliding surface of the rotating slide ring may have a depth different from the depth of the information structures on the sliding surface of the stationary slide ring. Moreover, individual information structures themselves in the sliding surface may have a different height profile, for example a stepped height profile within the information structure or an arcuate or wavy height profile within the recess. Further preferably, a plurality of separate recesses are provided in the sliding surfaces forming the information structures.

Providing the information structures in the form of recesses is particularly easy and inexpensive to implement and enables changes in the mechanical seal to be reliably detected. If, for example, small solid particles are present in the sealing gap between the two sliding surfaces of the stationary and rotating slide ring, said solid particles preferably settle in the information structures formed as recesses, changing sound generation and/or vibration generation when sliding the sliding surfaces past each other, which can then be detected by means of the sensor. The same applies if, for example, the density of the medium in the sealing gap changes, e.g. due to leakage of a product medium that enters the sealing gap.

Especially preferably, the information structures are inserted into the sliding surface as rectangular recesses. They are very easy and inexpensive to manufacture enabling reliable sound and/or vibration detection.

Especially preferably, the first information structure comprises first and second substructures arranged on the sliding surface of the rotating slide ring at different heights in the radial direction of the slide ring. Further preferably, the second information structure comprises third and fourth substructures arranged on the sliding surface of the stationary slide ring at heights differing in the radial direction of the slide ring. In this case, the substructures are arranged such that, when rotating, the first substructure moves past the third substructure and the second substructure moves past the third substructure.

To detect oscillations and/or vibrations most accurately, the sensor is preferably arranged directly on one of the slide rings, especially on the stationary slide ring or a stationary component. Further preferably, the sensor is arranged directly on a rear side of one of the slide rings, especially the rear side of the stationary slide ring.

In order for the information structure to not greatly disturb the sliding surface and thus the sealing ability of the mechanical seal, the information structures are preferably arranged in grooves provided in the sliding surface. The grooves are, for example, spiral grooves, which serve to enable the slide rings to be lifted off each other as quickly as possible when the machine is started. Alternatively, the information structures are arranged adjacent to grooves in the sliding surface.

According to a particularly preferred embodiment of the invention, the information structures are arranged on the sliding surfaces of the rotating and stationary slide rings such that a characteristic signal or melody is generated when the information structures move past each other. Thus, for example, a singing slide ring seal can be provided and any changes in the slide rings or the sliding surfaces can reliably be detected by changing the characteristic signal or melody.

An especially fast and simple approach to evaluation will be provided if the evaluation unit is preferably arranged to determine an amplitude ratio of a plurality of amplitudes generated by an information structure. This enables rapid evaluation of the detected sound signals and/or vibration signals.

Preferably, the sensor for detecting sound and/or vibration is a structure-borne sound sensor or an acceleration sensor. The structure-borne sound sensor is preferably arranged on the housing or a fixed component.

The present invention further relates to a method for monitoring a mechanical seal comprising a rotating slide ring and a stationary slide ring, wherein at least one information structure is present on each sliding surface of the slide rings. During operation, the method comprises the steps of recording sound signals and/or vibration signals generated by the information structures when moving past each other and comparing the recorded sound signals and/or vibration signals with stored sound signals and/or vibration signals to determine deviations.

Preferably, the state of the mechanical seal is inferred from the recorded sound signals and/or vibration signals.

Further preferably, when a predetermined deviation of the sound signals and/or the vibration signals from stored sound signals and/or vibration signals is detected, a maintenance message is issued. The message can, for example, be sent directly to a manufacturer of the mechanical seal arrangement or to a company in charge of maintenance, so that measures for a possible replacement of the mechanical seal arrangement can be started immediately.

To achieve the highest possible level of accuracy of the signals detected, the sound and/or vibration is preferably detected directly at one of the slide rings, especially the stationary slide ring or a slide ring carrier.

Figure 2:
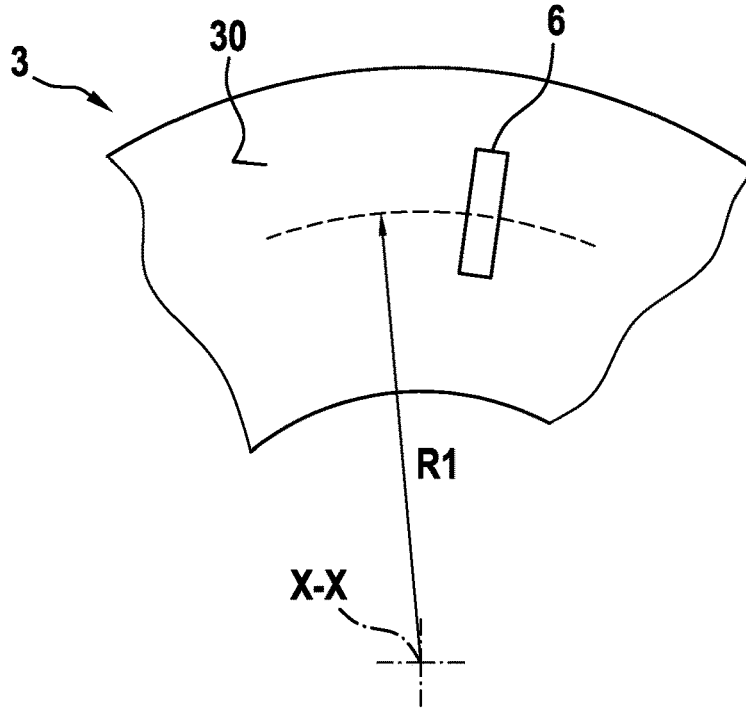
Figure 3:
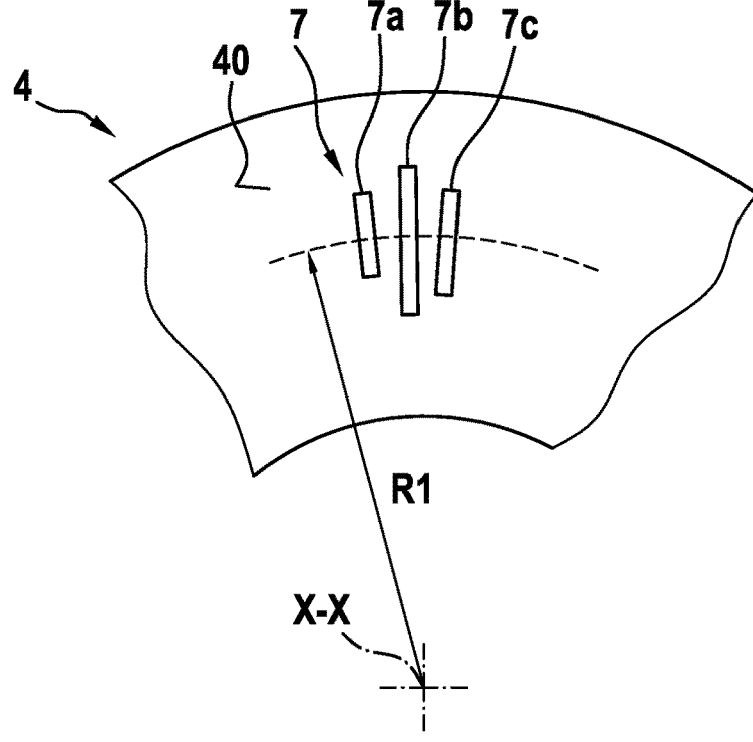
Figure 4:
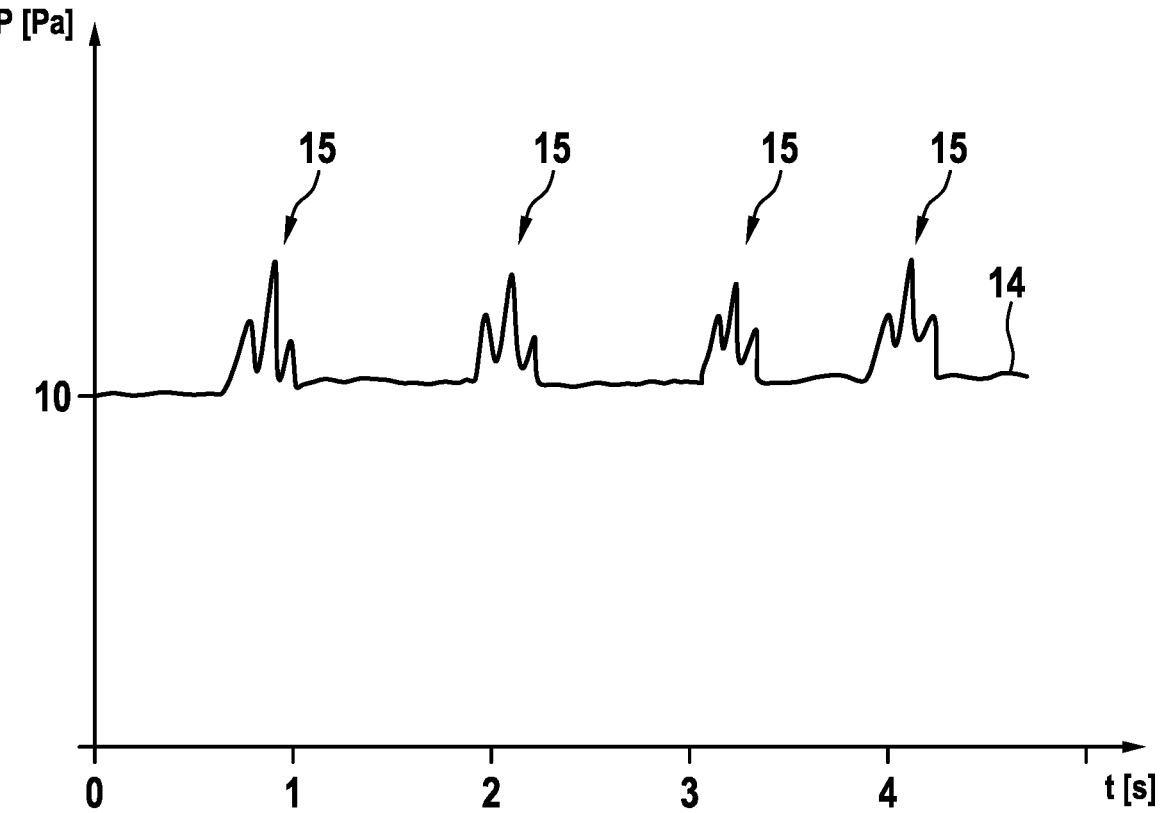
Figure 5:
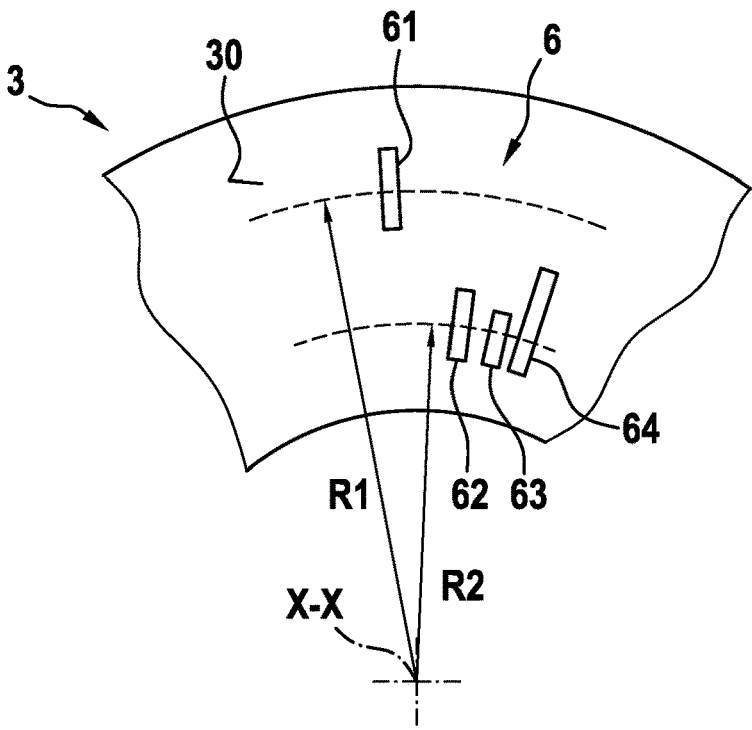
Figure 6:
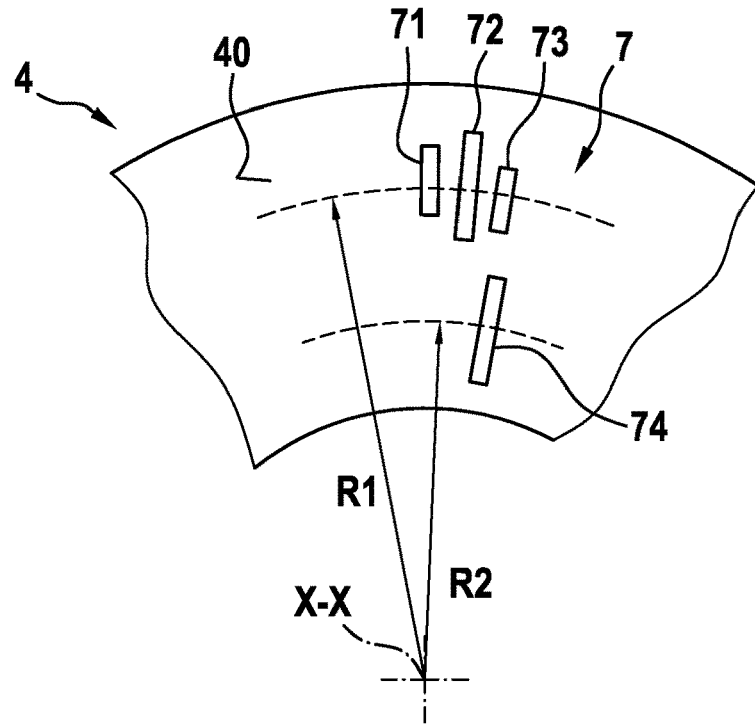
Figure 7:
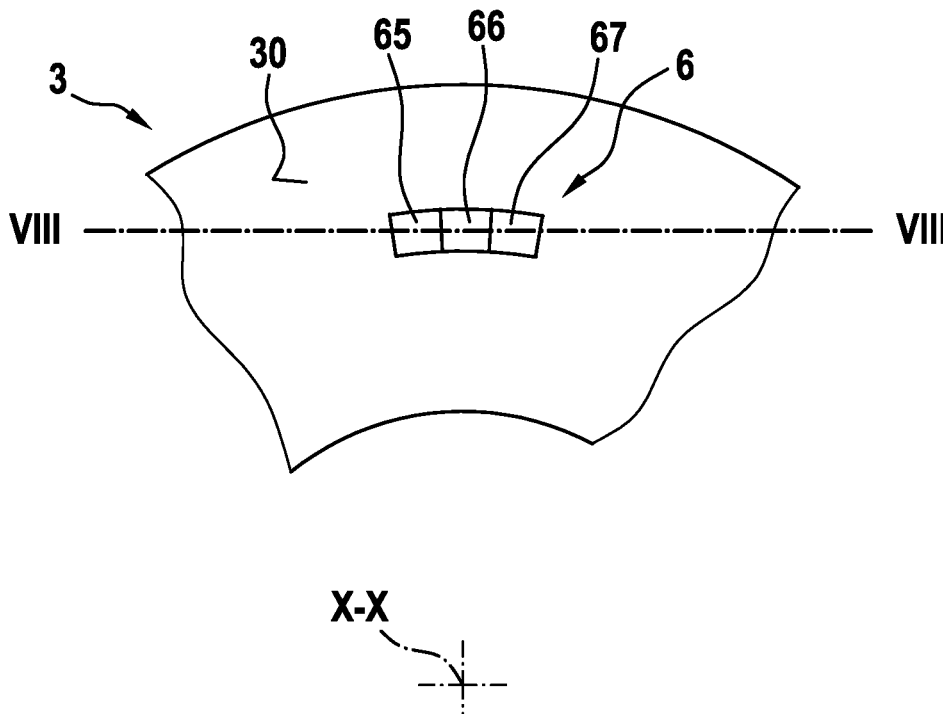
Figure 8:
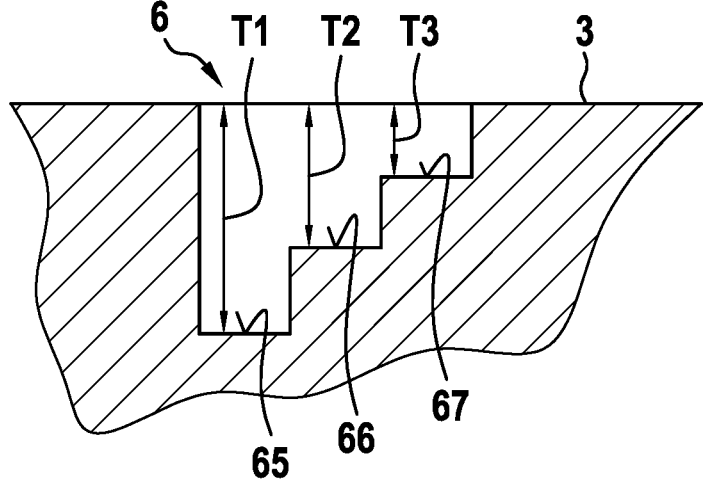
Figure 9:
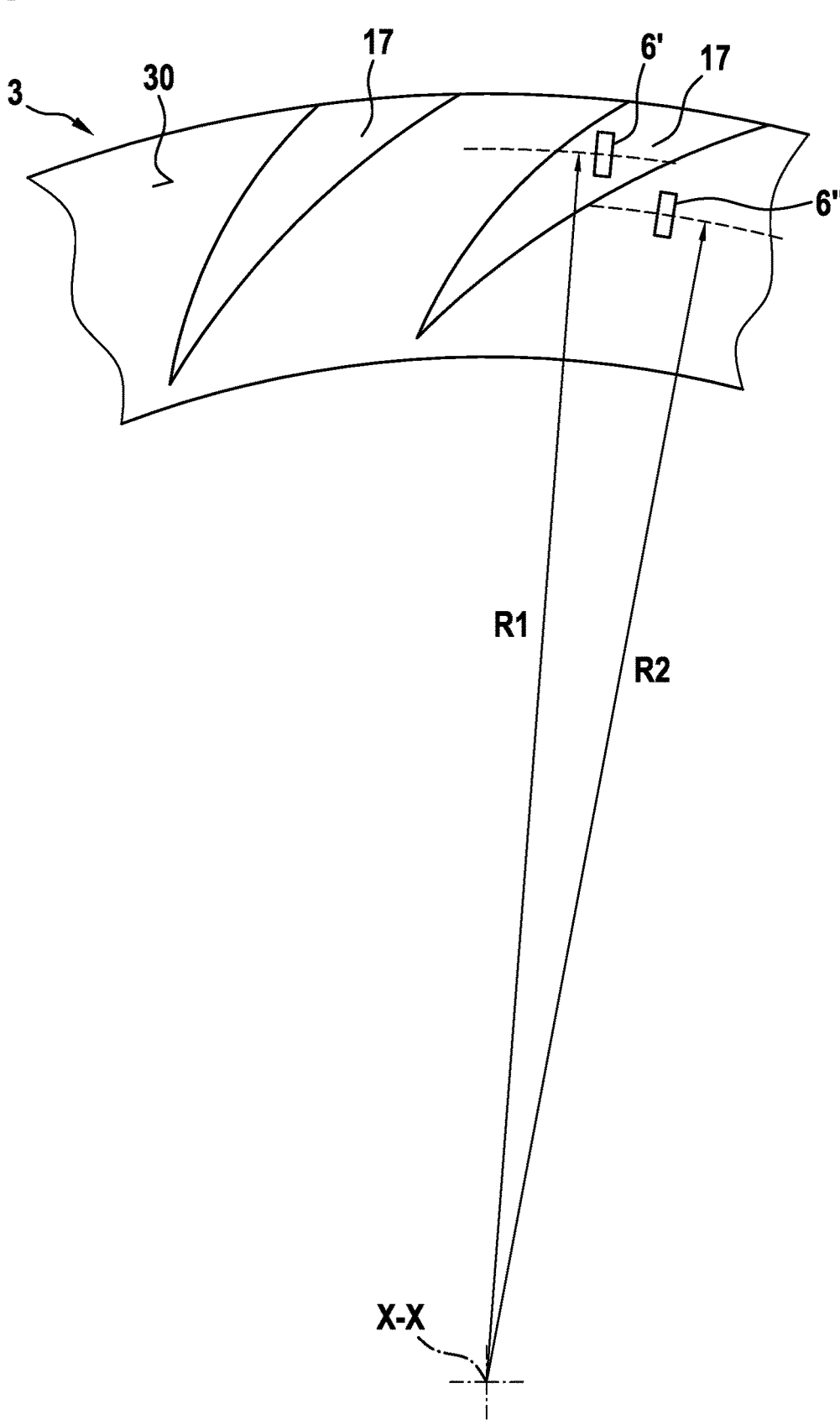

In the following, preferred embodiments of the invention will be described in detail while making reference to the accompanying drawing, wherein:

FIG. 1 is a schematic representation of a mechanical seal arrangement according to a first embodiment of the invention, FIG. 2 is a schematic partial top view of a sliding surface of a rotating slide ring of FIG. 1, FIG. 3 is a schematic partial plan view of a sliding surface of a stationary slide ring of FIG. 1, FIG. 4 is a diagram showing a sound pressure versus time generated by the information structures on the slide rings of FIGS. 2 and 3, FIG. 5 is a schematic, partial plan view of a sliding surface of a rotating slide ring according to a second embodiment of the invention, FIG. 6 is a schematic, partial plan view of a sliding surface of a stationary slide ring according to the second embodiment of the invention, FIG. 7 is a schematic top view of a sliding surface of a rotating slide ring according to a third embodiment of the invention, FIG. 8 is a schematic sectional view along line VIII-VIII of FIG. 7, and FIG. 9 is a schematic plan view of a sliding surface of a rotating slide ring according to a fourth embodiment of the invention.

In the following, a mechanical seal arrangement 1 according to a first preferred embodiment of the invention is described in detail, while making reference to FIGS. 1 to 4.

As may be seen from FIG. 1, the mechanical seal arrangement 1 comprises a mechanical seal 2 having a central axis X-X, a rotating slide ring 3 and a stationary slide ring 4. A sealing gap 5 is defined between the rotating slide ring 3 and the stationary slide ring 4.

The mechanical seal 2 seals a product region 12 from an atmosphere region 13.

FIGS. 2 and 3 each show a sliding surface of the rotating slide ring and stationary slide ring 3, 4, respectively. As can be seen from FIG. 2, a first information structure 6 is provided on a sliding surface 30 of the rotating slide ring 3. A second information structure 7 is provided on a sliding surface 40 of the stationary slide ring 4. In this example embodiment, three individual information structures 7a, 7b, 7c form the second information structure 7.

As may further be seen from FIGS. 2 and 3, the information structures 6, 7 are partially arranged on the sliding surfaces 30, 40 at the same radial height.

As may be seen in detail from FIG. 1, this results in an overlap area 16 for the information structures 6, 7 in the radial direction, the center of which lies on the radius R1. This ensures that, during operation, when the rotating slide ring 3 rotates with a shaft 11, the information structures are moved past each other during the rotation process.

As may be seen further from FIG. 1, the information structures 6, 7 of this embodiment are rectangular recesses on the sliding surface. The recesses are preferably about one to two μm in depth. The information structures provided as recesses can have the same width or different widths. As can be seen from FIG. 3, the information structures may also have different lengths in the radial direction.

When the first information structures 6 provided on the rotating slide ring 3 slide past the second information structure 7 comprising three individual information structures during operation, a characteristic sound signal is produced. This is shown in the diagram in FIG. 4.

FIG. 4 shows the sound pressure P in Pascal over the time t in seconds s as a sound pressure curve 14. As may be seen from the diagram, the characteristic amplitudes 15 result. Since the second information structure 7 comprises three different individual information structures 71, 72, 73, different heights of the amplitude 15 result.

As shown in FIG. 1, a sensor 8 is arranged directly on a rear side 41 of the stationary slide ring 4. The sensor 8 detects sound and/or vibration generated by the first and second information structures 6, 7 sliding past each other. The sensor 8 is connected to an evaluation unit 10, which is arranged on a housing 9 together with the stationary slide ring 4.

The evaluation unit 10 is arranged to compare the detected sound signals and/or the detected vibration signals with stored target values and to output a comparison result. If the comparison shows that deviation between the set values and the actual values is expressively high, the manufacturer of the mechanical seal or any company commissioned to carry out maintenance can react immediately.

Thus, monitoring of the mechanical seal arrangement 1 can be made possible in order to detect a risk of failure as early as possible and to take appropriate countermeasures, such as replacing the mechanical seal arrangement. In this context, the monitoring can be very inexpensive and simple in design. Especially a mean gap height, i.e. a vertical distance between the sliding surfaces of the slide rings 3, 4 in the direction of the central axis X-X can be determined in a simple way. Thus, even when monitoring the mechanical seal over the operating time, it can be determined whether the sealing gap 5 changes, especially as a so-called A-gap, i.e. the sealing gap 5 opens radially inwards, or as a so-called V-gap, i.e. the sealing gap opens radially outwards.

Furthermore, monitoring based on amplitude ratios can be carried out so that an absolute calibration of a signal level can be omitted. Also, the signals generated by the information structures 6, 7 can be easily distinguished from possible other existing signals from other sources.

It should also be noted that the sensor for detecting signals from the information structures, for example a structure-borne sound sensor, can also already be present on the machine to be sealed and can be connected to the evaluation unit 10. It is also possible to enable retrofitting of existing mechanical seal arrangements by installing slide rings with information structures.

It should further be noted that the first and second information structures 6, 7 can also be designed in such a way that a sound actually audible to a human ear is produced. In this connection, it would also be conceivable to generate certain melodies by means of the information structures, so that changes in this way can also be easily detected by human hearing.

FIGS. 5 and 6 show a mechanical seal arrangement 1 according to a second embodiment of the invention. As can be seen from FIGS. 5 and 6, the first information structure 6, which is arranged on the rotating slide ring 3, comprises a first substructure 61 and three second substructures 62, 63, 64. As can be further seen from FIG. 6, the stationary slide ring 4 has a second information structure 7 comprising three third substructures 71, 72, 73 and a fourth substructure 74.

As can be seen from FIGS. 5 and 6, regions of the first substructure 61 and the third substructures 71, 72, 73 are thereby arranged on the same first radius R1. Regions of the second substructures 62, 63, 64 and the fourth substructure 74 are arranged on the same second radius R2. The second radius R2 is significantly smaller than the first radius R1. Thus, a first sound signal and/or a first vibration signal can be generated by the substructures arranged on the first radius R1 and a second sound signal and/or vibration signal can be generated by the substructures arranged on the second radius R2. In this way, an accuracy of a monitoring can be significantly improved and especially a gap height of the sealing gap 5 can be reliably detected.

FIGS. 7 and 8 show a mechanical seal arrangement according to a third embodiment of the invention. As can be seen from FIG. 7, a first information structure 6 with three substructures 65, 66, 67 is shown on the rotating slide ring 3 in the third example embodiment. As can be seen from the sectional view of FIG. 8, the three substructures 65, 66, 67 each have different depths T1, T2 and T3.

Thus, in this embodiment, three substructures are integrated in a first information structure 6 formed as a recess. As it is shown in FIG. 8, the depths of the substructures vary in steps. The second information structure on the stationary slide ring, which is not shown, may then be formed in the same way as on the rotated slide ring 3 or, as in the previous example embodiments, may be formed by several, separate recesses in the sliding surface of the stationary slide ring.

FIG. 9 shows a mechanical seal arrangement according to a fourth embodiment of the invention. In the fourth example embodiment, a plurality of grooves 17 are provided in the sliding surface. The grooves 17 have a depth of only a few μm, wherein a first information structure 6' is arranged in the groove 17 and another first information structure 6" is provided outside the groove 17 in the sliding surface 30 of the rotating slide ring. The information structures 6', 6" in turn are formed on different radiuses R1, R2 so as to reliably detect especially a gap height of the sealing gap.

In other respects, this example embodiment is similar to the previous example embodiments, so that reference may be made to the description given above.

Generally, it should be noted for all embodiment examples that any combination of the designs of the first and second information structures 6, 7 is allowed. The first and second information structures 6, 7 formed as recesses may also assume any geometric shape. For example, recesses having continuously changing height profiles may also be provided as information structures 6, 7. Further alternatively, in addition to rectangular information structures, square information structures or circular or oval information structures or triangular information structures may also be provided.

LIST OF REFERENCE NUMBERS 1 mechanical seal arrangement
2 mechanical seal
3 rotating slide ring
4 stationary slide ring
5 sealing gap
6, 6', 6" first information structure
7 second information structure
7a, 7b, 7c single information structure
8 sensor
9 housing
10 evaluation unit
11 shaft
12 product region
13 atmosphere region
14 sound pressure curve
15 amplitude
16 overlap area
17 groove
30 sliding surface of rotating slide ring
40 sliding surface of the stationary slide ring
41 rear side of stationary slide ring
61 first substructure
62, 63, 64 second substructure
65, 66, 67 substructures having different depths
71, 72, 73 third substructure
74 fourth substructure
R1 first radius
R2 second radius
T1 first depth
T2 second depth
T3 third depth
X-X axial direction/central axis of the mechanical seal

The invention claimed is:

1. A mechanical seal arrangement comprising:
a mechanical seal comprising a rotating slide ring and a stationary slide ring defining a sealing gap therebetween,
wherein the rotating slide ring comprises a first sliding surface having a first information structure,
wherein the stationary slide ring comprises a second sliding surface having a second information structure, wherein the first information structure and the second information structure at least partially overlap in an overlap area, at least one sensor for detecting sound, the sound being generated by the first information structure when moving past the second information structure, an evaluation unit, which is arranged to compare the sound detected with set values and to output a comparison result, wherein based on a change of the detected sound information is inferred about the condition of the mechanical seal and an exchange thereof is arranged, wherein the first information structure and the second information structure comprise defined recesses in the sliding surfaces, wherein at least one sliding surface comprises grooves provided in the sliding surface, wherein the first information structure and/or the second information structure are arranged in the groove.

2. The mechanical seal arrangement according to claim 1, wherein the recesses are rectangular recesses or the like.

3. The mechanical seal arrangement according to claim 1, wherein the first information structure comprises a first substructure and a second substructure, the first and second substructures being arranged on the sliding surface of the rotating slide ring at different heights in the radial direction, and the second information structure comprises a third substructure and a fourth substructure, the third and fourth substructures being arranged on the sliding surface of the stationary slide ring at radially different heights, such that the first substructure and the third substructure have an overlap area on a first radius and the second substructure and the fourth substructure have an overlap area on a second radius.

4. The mechanical seal arrangement according to claim 1, wherein the sensor is arranged directly on one of the slide rings.

5. The mechanical seal arrangement according to claim 4, wherein the sensor is arranged directly on a rear side of the stationary slide ring or on a slide ring carrier.

6. The mechanical seal arrangement according to claim 1, wherein, during operation, a characteristic signal or melody is generated by the first information structure when moving past the second information structure.

7. The mechanical seal arrangement according to claim 1, wherein the evaluation unit is arranged to determine an amplitude ratio of a plurality of amplitudes generated by an information structure.

8. The mechanical seal arrangement according to claim 1, wherein the sensor is a structure-borne sound sensor or an acceleration sensor.

9. The mechanical seal arrangement according claim 1, wherein the sensor is a structure-borne sound sensor arranged on the housing or on the stationary component.

10. The mechanical seal arrangement according claim 1, wherein first information structure and/or the second information structure is provided at a bottom of the grooves and at a plurality of different depths.

11. The method according to claim 10, wherein:

the first information structure is provided in a first groove defined in the first sliding surface and comprises a first plurality of substructures each provided at a different depth of the first groove, the different depths varying stepwise; and the second information structure is provided in a second groove defined in the second sliding surface and comprises a second plurality of substructures each provided at a different depth of the second groove, the different depths varying stepwise.

12. A method of monitoring a mechanical seal having a rotating slide ring and a stationary slide ring, at least one information structure being provided on each of the sliding surfaces of the slide rings, in which method:

during operation, sound signals are generated by the first information structure when moving past the second information structure, and the generated sound signals are compared with sound signals stored in an evaluation unit, wherein based on a change of the detected sound information is inferred about the condition of the mechanical seal and an exchange thereof is arranged, wherein the first information structure and the second information structure comprise defined recesses in the sliding surfaces, wherein at least one sliding surface comprises grooves provided in the sliding surface, wherein the first information structure and/or the second information structure are arranged in the groove.

13. The method according to claim 12, wherein the state of the mechanical seal is deduced based on the sound signals detected.

14. The method according to claim 12, wherein a message is output in the event of any predetermined deviation of the sound signals detected from the sound signals stored.

15. The method according to claim 12, wherein the sound signals are detected directly at a slide ring, a slide ring carrier, or the stationary slide ring.

16. The method according to claim 12, wherein first information structure and/or the second information structure is provided at a bottom of the grooves and at a plurality of different depths.

17. The method according to claim 16, wherein the at least one sliding surface includes a first sliding surface on the rotating slide ring and a second sliding surface on the stationary slide ring, and wherein:

the first information structure is provided in a first groove defined in the first sliding surface and comprises a first plurality of substructures each provided at a different depth of the first groove, the different depths varying stepwise; and the second information structure is provided in a second groove defined in the second sliding surface and comprises a second plurality of substructures each provided at a different depth of the second groove, the different depths varying stepwise.

* * * * *